Patented Nov. 9, 1937

2,098,824

UNITED STATES PATENT OFFICE 2,098,824

PROCESS OF DESTRUCTIVELY DISTILLING CASHEW NUT SHELL LIQUID

Mortimer T. Harvey, East Orange, N. J., assignor to The Harvel Corporation, a corporation of New Jersey No Drawing. Application December 21, 1933, Serial No. 703,414

17 Claims. (Cl. 260—154)

The present invention relates to new compositions of matter and to methods and steps of making and using the same; and the present invention relates, more particularly, to new chemical compounds and derivatives thereof prepared from cashew nut shell liquid and to methods and steps for making and using the same.

Cashew nut shell liquid is described in the literature as consisting of about ninety per cent of anacardic acid, $C_{22}H_{32}O_3$ and about ten per cent of cardol, $C_{32}H_{52}O_4$, with very small fractional percentages of other materials.

According to the present invention, the cashew nut shell liquid is distilled at a greatly reduced pressure or in a stream of steam at atmospheric pressure to produce a compound having a molecular weight of 288, a boiling point of 225° C. at about 10 millimeters of mercury, an empirical formula of $C_{20}H_{32}O$, and a probable structural formula of $C_{14}H_{27}C_6H_4OH$. Characteristics and reactions indicate that this compound is a phenol with all or part of the $C_{14}H_{27}$ atoms together as one radical in the meta position with respect to the OH radical and with one unsaturated bond,

somewhere in the $C_{14}H_{27}$ atoms. This production of the new compound apparently takes place by the breaking down of the anacardic acid. Hereinafter, the new compound is called cardanol.

When cashew nut shell liquid is distilled in air at normal pressure it is cracked into a number of compounds, including cardanol, having various boiling points over a wide range; specifically, cashew nut shell liquid distilled in air at normal pressure comes over in a temperature range extending from about 310° C. (580° F.) to about 398° C. (750° F.). The distillate is redistilled at a pressure of about ten millimeters of mercury at which pressure the cardanol comes over at about 225° C. and thereby is separated from the other compounds of the distillate. In this respect the present application is a continuation of my copending application Serial Number 489,484, filed October 17, 1930, and allowed August 7, 1933, now Patent Number 1,950,085, issued March 6, 1934.

However, when cashew nut shell liquid is distilled at the reduced pressure of about ten millimeters of mercury the cardanol comes over at a constant boiling point of about 225° C. with a very little amount of other compounds. When the cardanol itself is distilled at normal pressure the boiling point of about 360° C. is constant and when it is distilled at ten millimeters of mercury the boiling point of about 225° C. is constant. In the distillation of cardanol in air a small amount of darkening compounds is formed if the hot cardanol or vapors thereof come in contact with the air. When the cardanol is distilled from cashew nut shell liquid at atmospheric pressure while steam is blown through the cashew nut shell liquid, as an illustrative example, a temperature of about 270° C. is maintained and the product, cardanol, comes over uniformly, actually in the form of an emulsion, the water of the condensed steam being dispersed in the new compound.

Due to conditions of removing cashew nut shell liquid from the cashew nut shells, the proportion of cardanol obtained from a given amount of cashew nut shell liquid varies with the condition of the cashew nut shell liquid. That is to say, in all present commercial methods of obtaining cashew nut shell liquid from the cashew nuts heat is used, either to char or carbonize the shells for opening them or for expelling the shell liquid from the shells, and the degrees of temperature at which these methods are carried out are such that decomposition of the cashew nut shell occurs with the production of compounds, such as catechol, which distill over with the cardanol and which turn dark on exposure to the light. This is a great disadvantage because most of the uses to which cardanol are put require a light color in the final product, for example, in coatings, varnishes, molded compositions, bottlecap paper, electrical insulation, and so on. Further, the greater the degree of purity of the cardanol the greater is the suitability of the product for its uses.

Naturally, the amount of cardanol obtainable from cashew nut shell liquid depends upon the conditions to which the cashew nut shell liquid has been subjected previous to its treatment to obtain cardanol, and more cardanol is obtainable from cashew nut shell liquid which is extracted from the nuts at low temperature than from cashew nut shell liquid which has been excessively heated. From low temperature extracted cashew nut shell liquid the proportion of cardanol can be as high as 70% or more while from cashew nut shell liquid obtained by some methods still in use the proportion is as low as 40 to 50%.

According to the present invention, this disadvantage is overcome either by obtaining the cashew nut shell liquid at normal temperature as by solvent extraction or by keeping the nuts at a comparatively low temperature when heating to expel the shell liquid, for example, at below 200° C.; also, the difficulty is overcome by changing the darkening compounds which go over with the cardanol into compounds which will not go over with it. These darkening compounds can be saturated to produce compounds which will not distill over at the temperatures at which cardanol is distilled. This I do by blowing air, oxygen, or hydrogen through the cashew nut shell liquid before it is distilled to take off cardanol or by blowing the cardanol with these same materials before it is redistilled for purification, this blowing being done with the cashew nut shell liquid or the cardanol on the alkaline side or with a catalyst such as copper-nickel for the hydrogen.

Illustrative examples of methods of preparing cardanol are given below together with descriptions of these materials and statements of their uses.

1. Cashew nut shell liquid is obtained from the shells of cashew nuts at a low temperature by removing the shells from the kernels and extracting the shell liquid at normal temperature with a solvent such as benzol, after which the benzol is distilled off. Or cashew nut shell liquid is expelled from the shells by immersing cashew nuts for about four minutes in a bath of cashew nut shell liquid which is at a temperature of about 165° C. The expelled shell liquid will mingle with the liquid of the bath and for this reason the liquid of the bath should be in a pure state, obtained, for example, by either the extraction or expulsion method just described.

The cashew nut shell liquid obtained at a low temperature in this manner is distilled with steam at about 270° C. through a condenser at which temperature cardanol comes over with the water of the condensed steam emulsified therein, the water being the dispersed phase. Upon standing most of the emulsion breaks, but heat is applied to about 90° C. to completely break the emulsion, after which the cardanol and the water are separated. When it is so desired, the cardanol is further purified by distilling at the reduced pressure of about ten millimeters of mercury.

Also, the cardanol is obtained from the cashew nut shell liquid obtained at low temperature by one or more distillations at about ten millimeters of mercury, the number of distillations being determined by the degree of purity desired in the cardanol.

2. When cardanol is to be prepared from cashew nut shell liquid which is obtained by some of the commercial methods still in use and in which excessive heating is employed to expel the shell liquid from the nuts, it contains compounds which contain active unsaturated bonds and which turn dark upon exposure to the light, such as catechol, for example. These are broken off from the cashew nut shells by the excessive heating. To obtain cardonal which is free of these darkening compounds the methods of steam distillation and/or of distillation at ten millimeters of mercury, as above described, are used, but previous to one or more of the distillation steps the cashew nut shell liquid or the cardanol is blown with air, oxygen, hydrogen or other suitable gas to saturate the unsaturated bonds and to obtain compounds which have higher boiling points than the cardanol and which do not go over with the cardanol when the latter is distilled. This blowing is done on the alkaline side for which caustic soda in amount about one to two per cent of the weight of the cashew nut shell liquid or cardanol is added before the blowing is begun. Examples of time and temperature for this blowing are for about two or three hours at about 80° to 100° C., but other periods and temperatures can be employed. Ammonia and potassium hydroxide are other illustrative examples of materials for putting the material on the alkaline side.

Another method for saturating the darkening compounds before one of the distilling steps is to heat the cashew nut shell liquid or cardanol with an oxidizing agent such for example as sodium perborate. About one or two per cent of the weight of the cashew nut shell liquid or cardanol in sodium perborate, and at about 270° C. for about two to three hours are examples of amount, temperature and time of heating.

Another method of getting cardanol free of darkening compounds is to wash the cashew nut shell liquid or the cardanol with water, for example, in scrubbing towers or by shaking with water and separating the cashew nut shell liquid or cardanol from the water solution of the darkening compounds. This washing can be followed by a distillation step, if desired or required as in the distillation of the cashew nut shell liquid or for further purification of the cardanol.

Characteristics of cardanol

Molecular weight___ 288
Empirical formula___ $C_{20}H_{32}O$
Accepted structural formula_____ $C_6H_4\begin{smallmatrix}OH\\C_{14}H_{27}\end{smallmatrix}$ (1,3)

Index of refraction- $N_D^{25}$ 1.5112
Boiling point_____ About 225° C. at ten millimeters of mercury
Melting point_____ Below minus 20° C. at normal pressure
Density_____ 0.930 at 20° C.
Color (in liquid state)_____ Straw color

Uses of cardanol

Cardanol is useful for making coatings such as paints, varnishes, lacquers, and so on, for impregnating compounds, for molded compounds and these products are also highly suitable for electrical insulation, for chemical and water and moisture proofings. Cardanol can be reacted with formaldehyde, hexamethylene tetramine, paraformaldehyde, paint and varnish driers such as manganese resinate, lead oxides including litharge, metal-organic driers such as cobalt acetate and copper oleate, and other reactions such as are shown for cashew nut shell liquid reactions in my patents listed below, to which reference is hereby made. The present invention is an improvement on the inventions disclosed in these patents and the products of cardanol have further advantages than the cashew nut shell liquid itself, for example, the cardanol-cresol-formaldehyde condensation products are soluble to a greater extent in linseed and China-wood oils than are the cashew nut shell liquid-cresol-formaldehyde condensation products; cardanol is more effective as a solvent and plasticizer for cellulose esters such as nitrocellulose, cellulose acetate and for the latter, known to be difficultly plasticized, it is a very good plasticizer. Following is a list of patents issued to me and cited to give examples of the application of products of the invention: Patent Nos. 1,725,791 to 1,725,797, inclusive issued August 27, 1929; 1,771,785 and 1,771,786 issued July 29, 1930; 1,819,416 issued August 18, 1931; 1,838,070 to 1,838,077, inclusive, issued December 22, 1931; 1,921,292 and 1,931,293 issued August 8, 1933; 1,939,301 issued December 12, 1933; and 1,939,773 issued December 19, 1933.

This application is a continuation in part of my copending application Ser. No. 489,484, filed October 17, 1930.

What I claim and desire to protect by Letters Patent is:

1. The method which comprises removing from cashew nut shell liquid a phenolic product having a boiling point of about 360° C. at normal pressure and a boiling point of about 225° C. at a pressure of about ten millimeters of mercury by destructively distilling said cashew nut shell liquid.

2. The method which comprises destructively distilling cashew nut shell liquid and removing from the distillate a phenolic product having a boiling point of about 360° C. at normal pressure and a boiling point of about 225° C. at a pressure of about ten millimeters of mercury.

3. The method which comprises distilling cashew nut shell liquid at atmospheric pressure in a temperature range between 310° C. and about 398° C. and removing from the distillate a phenolic product having a boiling point of about 360° C. at normal pressure and a boiling point of about 225° C. at a pressure of about ten millimeters of mercury.

4. The method which comprises distilling cashew nut shell liquid at a pressure of about ten millimeters of mercury and at a temperature of about 225° F. to obtain a phenolic product having a boiling point of about 360° C. at normal pressure.

5. The method which comprises extracting cashew nut shell liquid from cashew nuts at a temperature below about 200° C. and thereafter removing therefrom a phenolic product which has a boiling point of about 225° C. at a pressure of about ten millimeters of mercury by destructively distilling said cashew nut shell liquid.

6. The method which comprises extracting cashew nut shell liquid at low temperature and then distilling at atmospheric pressure while blowing steam through the cashew nut shell liquid to produce a phenolic compound having a boiling point of about 225° C. at ten millimeters of mercury.

7. The method including the steps of claim 6 followed by the step of distilling the distillate at a pressure of ten millimeters of mercury.

8. The method which comprises the step of extracting cashew nut shell liquid from cashew nuts by expulsion while controlling the heat to keep at a minimum the production of compounds which darken on exposure to the light and subsequently destructively distilling the cashew nut shell liquid to produce a phenolic product having an atomic weight of about 288 and a boiling point of about 225° C. at ten millimeters of mercury.

9. In the process which includes the steps of destructively distilling cashew nut shell liquid to remove therefrom a distillate having a boiling point of 225° C. at 10 m. m. of mercury and subsequently purifying said distillate by distilling at 10 m. m. of mercury, the step for reducing impurities having active unsaturated bonds obtainable by said process which comprises saturating said impurities by blowing with hydrogen previous to one of said distilling steps to produce compounds which do not distill at temperatures up to about 225° C. at ten millimeters of mercury.

10. In the process which includes the steps of destructively distilling cashew nut shell liquid to remove therefrom a distillate having a boiling point of 225° C. at 10 m. m. of mercury and subsequently purifying said distillate by distilling at 10 m. m. of mercury, the step for reducing impurities having active unsaturated bonds obtainable by said process which comprises saturating said impurities while the material to be distilled is on the alkaline side by blowing with hydrogen previous to one of said distilling steps to produce compounds which do not distill at temperatures up to about 225° C. at ten millimeters of mercury.

11. In the process of destructively distilling a material having a boiling point of 225° C. at 10 m. m. of mercury from cashew nut shell liquid, the step for reducing the amount of impurities having active unsaturated bonds which comprises saturating said impurities previous to distilling to produce compounds which do not distill at 225° C. at a pressure of ten millimeters of mercury.

12. In the destructive distillation method of treating cashew nut shell liquid to obtain a phenolic compound having a boiling point of about 225° C. at a pressure of ten millimeters of mercury, the step which comprises washing with water to remove compounds which turn dark on exposure to light.

13. A phenolic compound; having one oxygen atom; having a boiling point of about 225° C. at a pressure of 10 millimeters of mercury; having a molecular weight of about 288; and identifiable as obtainable from cashew nut shell liquid by distillation at a vapor temperature of about 225° C. at 10 m. m. of mercury, and by steam distillation at normal pressure.

14. A phenolic compound obtainable from cashew nut shell liquid and having the following identification: molecular weight 288; approximate empirical formula, $C_{20}H_{32}O$; structural formula,

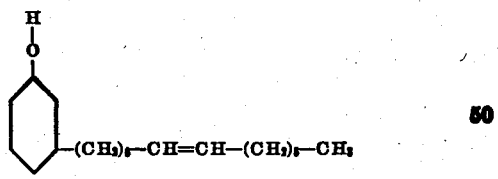

index of refraction, $N_D^{25}$ 1.5112; boiling point, about 225° C. at ten millimeters of mercury; melting point, below minus 20° C.; density, about 0.930 at 20° C.

15. The method which comprises destructively distilling cashew nut shell liquid with steam to obtain a phenolic compound having a boiling point of about 225° C. at a pressure of about ten millimeters of mercury.

16. The method which comprises destructively distilling cashew nut shell liquid with steam at atmospheric pressure and a temperature of about 270° C. to produce a phenolic compound having a boiling point of about 225° C. at about ten millimeters of mercury.

17. The method which comprises breaking down anacardic acid, identified as the major constituent of cashew nut shell liquid, with the aid of heat to produce a compound having the formula $C_{14}H_{27}C_6H_4OH$ and distilling off said compound.

MORTIMER T. HARVEY.